United States Patent
Choi et al.

(10) Patent No.: US 12,537,722 B2
(45) Date of Patent: Jan. 27, 2026

(54) DEVICE FOR ESTIMATING CHANNEL IN WIRELESS COMMUNICATION SYSTEM

(71) Applicant: Samsung Electronics Co., Ltd., Suwon-si (KR)

(72) Inventors: Junil Choi, Daejeon (KR); Hwanjin Kim, Daejeon (KR)

(73) Assignees: Samsung Electronics Co., Ltd., Gyeonggi-do (KR); Korea Advanced Institute of Science and Technology, Daejeon (KR)

( * ) Notice: Subject to any disclaimer, the term of this patent is extended or adjusted under 35 U.S.C. 154(b) by 248 days.

(21) Appl. No.: 18/454,367

(22) Filed: Aug. 23, 2023

(65) Prior Publication Data

US 2024/0080227 A1    Mar. 7, 2024

(30) Foreign Application Priority Data

Aug. 31, 2022 (KR) .......................... 10-2022-0110123
Oct. 12, 2022  (KR) .......................... 10-2022-0130575

(51) Int. Cl.
*H04L 25/02* (2006.01)

(52) U.S. Cl.
CPC ...... *H04L 25/0254* (2013.01); *H04L 25/0224* (2013.01)

(58) Field of Classification Search
CPC .................. H04L 25/0254; H04L 25/0224
See application file for complete search history.

(56) References Cited

U.S. PATENT DOCUMENTS

| | | | |
|---|---|---|---|
| 11,095,327 B2 | 8/2021 | Wu et al. | |
| 11,258,473 B2 | 2/2022 | Luo | |
| 2021/0314036 A1 | 10/2021 | Baknina et al. | |
| 2022/0278728 A1* | 9/2022 | Vankayala | G06N 3/045 |

FOREIGN PATENT DOCUMENTS

| | | |
|---|---|---|
| KR | 20210128841 A | 10/2021 |
| KR | 102067114 | 2/2022 |
| KR | 102355383 B1 | 2/2022 |

OTHER PUBLICATIONS

Kim, H. et al. "Low-Complexity Massive MIMO Channel Prediction via Meta-Learning and Deep Denoising" *IEEE*, (Dec. 11, 2021).

Muddasar Naeem et al., "Application of Reinforcement Learning and Deep Learning in Multiple-Input and Multiple-Output (MIMO) Systems", Sensors 2022, 41pg, 20211231.

(Continued)

*Primary Examiner* — Zhiren Qin
(74) *Attorney, Agent, or Firm* — Harness, Dickey & Pierce, P.L.C.

(57) ABSTRACT

A method and a device for estimating a channel in a wireless communication system are provided. Provided is a meta learning device including processing circuitry configured to receive pilot signals from a plurality of first user equipment (UEs) to obtain received pilot signals, the received pilot signals being based on existing wireless communication connections of the plurality of first UEs, and estimate channels of a plurality of second UEs via meta learning using the received pilot signals, the channels corresponding to new wireless communication connections of the plurality of second UEs.

20 Claims, 8 Drawing Sheets

(56) References Cited

OTHER PUBLICATIONS

Hengxi Mao et al., "RoemNet: Robust Meta Learning Based Channel Estimation in OFDM Systems", ICC 2019—2019 IEEE International Conference on Communications (ICC), 7pg, 20190715.

W. Jiang et al., "Long-range MIMO channel prediction using recurrent neural networks", 2020 IEEE 17th Annual Consumer Communications Networking Conference (CCNC), pp. 1-6.

J. Yuan et al., "Machine learning-based channel prediction in massive MIMO with channel aging", IEEE Transactions on Wireless Communications, pp. 2960-2973, May 2020.

E. Balevi et al., "Massive MIMO channel estimation with an untrained deep neural network", IEEE Transactions on Wireless Communications, pp. 2079-2090, Mar. 2020.

Y. Yang et al., "Deep transfer learning-based downlink channel prediction for FDD massive MIMO systems", IEEE Transactions on Communications, pp. 7485-7497, Dec. 2020.

H. Kim et al., "Massive MIMO channel prediction: Kalman filtering vs. machine learning", IEEE Transactions on Communications, pp. 518-528, Jan. 2020.

Hwanjin Kim et al., "Low-complexity massive MIMO channel prediction via meta-learning and deep denoising", 2022 KICS Winter Conference, pp. 0417-0418, Feb. 10, 2022.

\* cited by examiner

200

DEVICE FOR ESTIMATING CHANNEL IN WIRELESS COMMUNICATION SYSTEM

CROSS-REFERENCE TO RELATED APPLICATION

This application claims priority from Korean Patent Application No. 10-2022-0110123 filed on Aug. 31, 2022 and No. 10-2022-0130575 filed on Oct. 12, 2022 in the Korean Intellectual Property Office, and all the benefits accruing therefrom under 35 U.S.C. 119, the contents of which in their entirety are herein incorporated by reference.

BACKGROUND

Field

The present disclosure relates to a method and a device for estimating a channel in a wireless communication system.

Description of Related Art

In order to efficiently estimate the channel of a new UE (user equipment) connected to the massive multi-antenna (multiple-input and multiple-output) wireless communication system using a large number of antennas, acquisition of an accurate channel information (channel state information: CSI) is important.

A data transmission rate between a base station and the UE in the wireless communication system may be lowered due to channel change resulting from mobility of the UE (user equipment).

SUMMARY

Embodiments of the present disclosure provide a wireless communication system with improved channel estimating efficiency on a channel of a new UE connected to a base station. Embodiments provide a method for adaptively and quickly estimating a channel of a new UE (user equipment) connected to a massive multi-antenna (multiple-input and multiple-output) wireless communication system. Embodiments provide a machine learning-based channel estimating device or circuit to accurately predict the channel information (channel state information: CSI) in an environment in which the UE is mobile.

Embodiments of the present disclosure provide a base station of a wireless communication system with improved channel estimating efficiency on a channel of a new UE connected to the base station.

Embodiments of the present disclosure provide a channel estimating device of a wireless communication system with improved channel estimating efficiency on a new UE connected to a base station.

Embodiments the present disclosure are not limited to the above-mentioned examples. Embodiments of the present disclosure may be understood based on following descriptions, and may be more clearly understood based on examples according to the present disclosure. Further, it will be easily understood that embodiments of the present disclosure may be realized using means illustrated in the claims and combinations thereof.

According to an aspect of the present inventive concepts, there is provided a meta learning device including processing circuitry configured to receive pilot signals from a plurality of first user equipment (UEs) to obtain received pilot signals, the received pilot signals being based on existing wireless communication connections of the plurality of first UEs, and estimate channels of a plurality of second UEs via meta learning using the received pilot signals, the channels corresponding to new wireless communication connections of the plurality of second UEs.

According to an aspect of the present inventive concepts, there is provided a base station of a wireless communication system, a plurality of first user equipment (UEs) having been connected to the base station, and the base station including processing circuitry configured to receive pilot signals from the plurality of first UEs to obtain received pilot signals, and estimate channels of a plurality of second UEs via meta learning using the received pilot signals, the plurality of second UEs being newly connected to the base station.

According to an aspect of the present inventive concepts, there is provided a channel estimating device of a wireless communication system, the channel estimating device including processing circuitry configured to receive pilot signals from a plurality of first user equipment (UEs) to obtain received pilot signals, the plurality of first UEs having been connected to a base station of the wireless communication system, estimate channels of a plurality of second UEs via meta learning using the received pilot signals, the plurality of second UEs being newly connected to the base station, and remove noise contained in an input value of the meta learning.

BRIEF DESCRIPTION OF DRAWINGS

The above and other aspects and features of the present disclosure will become more apparent by describing in detail illustrative examples thereof with reference to the attached drawings, in which.

DETAILED DESCRIPTIONS

Figure 1:
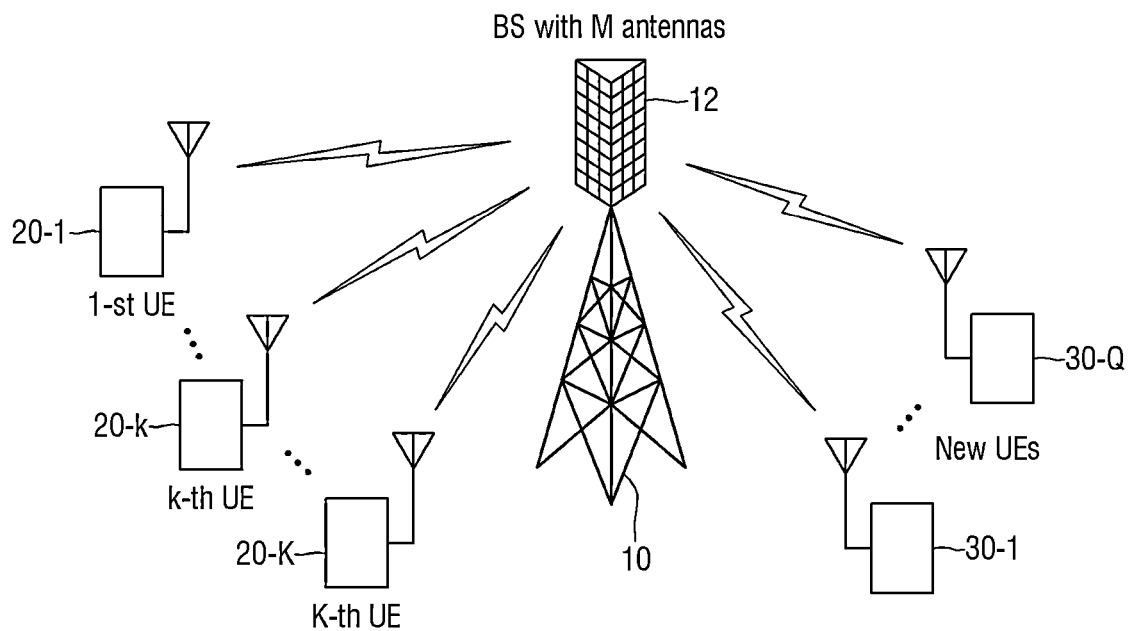
FIG. 1 is an illustrative diagram illustrating a wireless communication system according to embodiments.

The same reference numbers in different drawings represent the same or similar elements, and as such perform similar functionality. Further, descriptions and details of well-known operations and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Embodiments are illustrated and described further below. It will be understood that the description herein is not intended to limit the claims to the specific examples described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating examples of the present disclosure are illustrative, and the present disclosure is not limited thereto. The same reference numerals refer to the same (or similar) elements herein. Further, descriptions and details of well-known operations and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular examples only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify an entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as, or a similar meaning to, that commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain example may be implemented differently, a function or operation specified in a specific block may occur in a sequence different from that specified in a flowchart. For example, two consecutive blocks may actually be executed at the same time (or contemporaneously). Depending on a related function or operation, the blocks may be executed in a reverse sequence.

In embodiments of the present disclosure, a hardware-based approach is described by way of example. However, embodiments of the present disclosure may be implemented using hardware, and/or hardware and software. Thus, embodiments of the present disclosure do not exclude a combined hardware and software-based approach.

FIG. 1 is an illustrative diagram illustrating a wireless communication system according to embodiments.

Referring to FIG. 1, nodes using a radio frequency (RF) channel in a wireless communication system according to embodiments include a base station 10, a plurality of UEs 20-1 to 20-K, and new UEs 30-1 to 30-Q.

For reference, FIG. 1 shows only one base station. However, the wireless communication system according to embodiments may further include another base station that is the same as or similar to the base station 10.

The base station 10 is a network infrastructure that provides wireless access to the UEs 20-1 to 20-K, and 30-1 to 30-Q, where K is a natural number of 2 or larger, and Q is a natural number of 2 or larger. The base station 10 has a coverage defined as a predefined or alternatively, given geographic area based on a distance by which the base station is capable of transmitting a signal. The base station 10 may be referred to 'access point (AP)', 'eNodeB (eNB)', '5G node (5th generation node)', 'next generation nodeB (gNB)', 'wireless point (WP)', 'transmission/reception point (TRP)' or other terms having an equivalent technical meaning thereto.

The base station 10 constituting the massive multi-antenna (multiple-input and multiple-output: MIMO) wireless communication system may be connected to M antennas 12 (M is a natural number of 2 or larger).

Each of the UEs 20-1 to 20-K and 30-1 to 30-Q refers to a user device and performs communication with the base station 10 via the RF channel. In some cases, at least one of the UEs 20-1 to 20-K and 30-1 to 30-Q may operate without user involvement. That is, at least one of the UEs 20-1 to 20-K and 30-1 to 30-Q may be a device that performs machine type communication (MTC) and may not be carried by the user. Each of the UEs 20-1 to 20-K, and 30-1 to 30-Q may be referred to as 'mobile station', 'subscriber station', 'remote terminal', 'wireless terminal', or 'user device' or other terms having an equivalent technical meaning thereto.

The UEs 20-1 to 20-K are UEs connected to the base station 10 at a past time based on a current time when the base station 10 estimates a channel (e.g., the UEs 20-1 to 20-K are connected to the base station 10 at a specific time). Further, the UEs 30-1 to 30-Q are UEs not connected to the base station 10 in the past time based on the current time when the base station estimates the channel (e.g., the new UEs 30-1 to 30-W are not connected to the base station 10 at the specific time). Thus, each of the UEs 30-1 to 30-Q will be newly connected to the base station 10 (e.g., after the specific time) and thus a channel thereof will be estimated by the base station. According to embodiments, the connections of the UEs 20-1 to 20-K with the base station 10 represent existing wireless communication connections, and the connections of the UEs 30-1 to 30-Q with the base station 10 represent new wireless communication connections.

The base station 10 uses a large number of antennas 12. Thus, it may be difficult for the base station 10 to instantly estimate channel change due to moving UEs 20-1 to 20-K, and 30-1 to 30-Q. Further, a data transmission rate (data rate) may decrease due to the channel change resulting from the moving UEs 20-1 to 20-K and 30-1 to 30-Q. In this massive multi-antenna (multiple-input and multiple-output: MIMO) wireless communication system, an amount of channel information increases during a channel estimating process due to use of the massive array antenna 12, such that a large amount of feedback may be used, and thus channel estimating efficiency may decrease.

Further, in the massive multi-antenna (multiple-input and multiple-output: MIMO) wireless communication system, interference between the UEs 20-1 to 20-K, and 30-1 to 30-Q may occur, thereby reducing channel estimating accuracy.

Therefore, the wireless communication system according to embodiments may use a channel estimating device to be described later to minimize (or reduce) an amount of the channel information which may otherwise increase in the channel estimating process, and to remove or reduce the interference or noise contained in data used in the channel estimating process, thereby increasing the channel estimating efficiency.

Hereinafter, a channel estimating operation using the channel estimating device will be described in detail. The channel estimating device as described below may be embodied as a channel estimating circuit or a channel estimation unit. As used herein, terms such as "~ unit" may mean means that processes at least one function or operation, and may be implemented as hardware, or a combination of hardware and software.

For reference, hereinafter, the channel estimating device is collectively referred to as the channel estimation unit.

Figure 2:
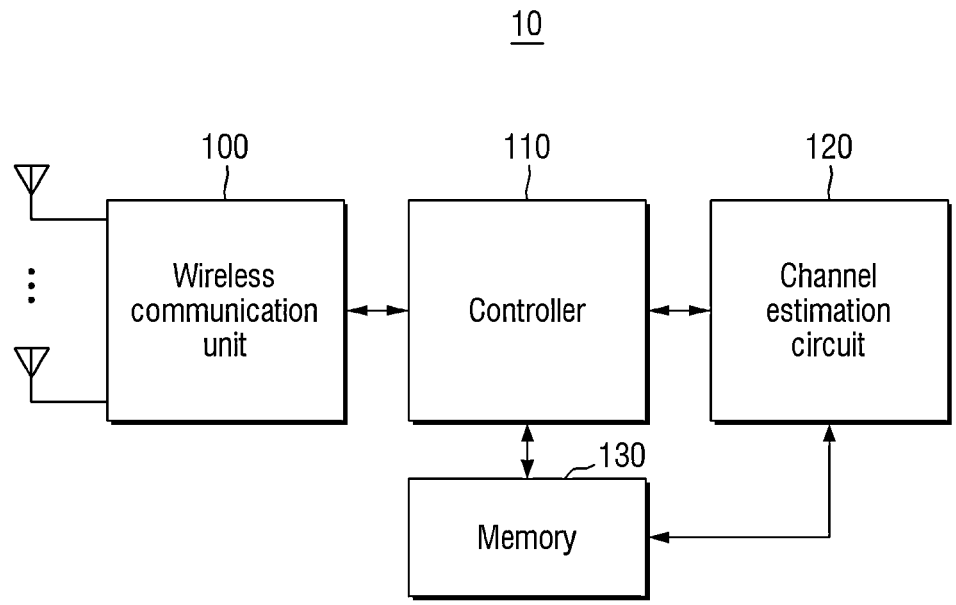
FIG. 2 and FIG. 3 are illustrative block diagrams illustrating a base station of a wireless communication system according to embodiments.
Figure 3:
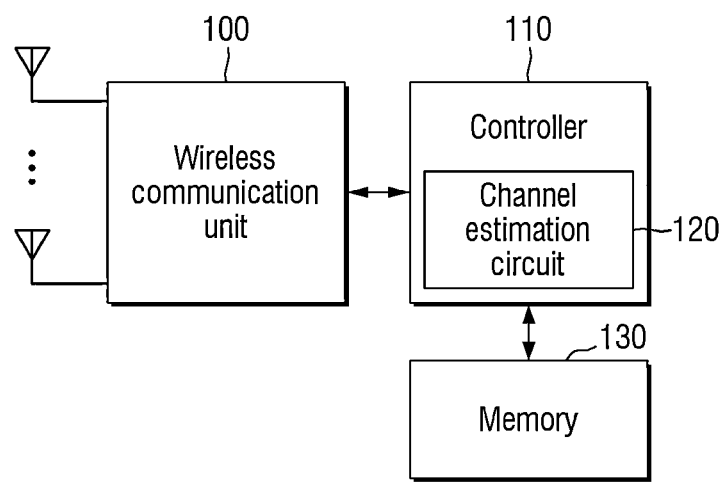

FIG. 2 and FIG. 3 are illustrative block diagrams illustrating a base station of a wireless communication system according to embodiments.

Referring to FIG. 2 and FIG. 3, the base station 10 includes a wireless communication unit 100, a controller 110, a channel estimation unit 120, and/or a memory 130.

The wireless communication unit 100 performs functions for transmitting and receiving a signal via the RF channel. For example, the wireless communication unit 100 performs a conversion function between a baseband signal and a bit stream according to a physical layer standard of the system. For example, when transmitting data, the wireless communication unit 100 encodes and modulates a bit stream to be transmitted to generate complex symbols. Further, when receiving data, the wireless communication unit 100 reconstructs a received bit stream via demodulation and decoding of the baseband signal.

Further, the wireless communication unit 100 up-converts the baseband signal into an RF (radio frequency) band signal, transmits the RF band signal through the antenna, and down-converts the RF band signal received through the antenna into the baseband signal. To this end, the wireless communication unit 100 may include a transmit filter, a receive filter, an amplifier, a mixer, an oscillator, a DAC (digital to analog convertor), an ADC (analog to digital convertor), and the like. Further, the wireless communication unit 100 may include a plurality of transmission/reception paths. Furthermore, the wireless communication unit 100 may include at least one antenna array composed of a plurality of antenna elements.

In terms of hardware, the wireless communication unit 100 may be composed of a digital unit and an analog unit. The analog unit may be composed of a plurality of sub-units according to operation power, an operation frequency, and the like. The digital unit may be implemented using at least one processor (for example, a DSP (digital signal processor)).

The wireless communication unit 100 transmits and receives a signal as described above. Accordingly, an entirety or a portion of the wireless communication unit 100 may be referred to as a 'transmitter,' a 'receiver' or a 'transceiver'. Further, in following descriptions, transmission and reception performed via the RF channel are used to mean including that the above-described processing is performed by the wireless communication unit 100.

The memory 130 stores data such as a basic program, an application program, and setting information for operation of the base station. The memory 130 may be embodied as a volatile memory, a non-volatile memory, or a combination of a volatile memory and a non-volatile memory. In addition, the memory 130 provides the stored data therein according to a request from the controller 110.

Continuing to refer to FIG. 1 to FIG. 3, the channel estimation unit 120 may be disposed outside the controller 110, or may be included inside the controller 110. A configuration of the base station 10 according to embodiments is not limited to the drawings.

The channel estimation unit 120 estimates a channel of each of new UEs 30-1 to 30-Q to be connected to the base station 10, based on information (for example, pilot signals) received through the plurality of UEs 20-1 to 20-K connected to the base station 10.

Hereinafter, an operation in which the channel estimation unit 120 estimates channels of the new UEs 30-1 to 30-Q to be connected to the base station 10 and a configuration of the channel estimation unit 120 will be described in detail.

Figure 4:
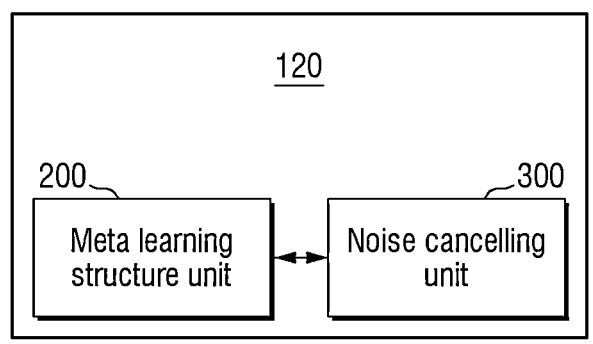
FIG. 4 is an illustrative block diagram illustrating a channel estimating device of a wireless communication system according to embodiments.

FIG. 4 is an illustrative block diagram illustrating a channel estimating device of a wireless communication system according to embodiments.

Referring to FIG. 1 and FIG. 4, the channel estimation unit 120 includes a meta learning structure unit 200 and/or a noise canceling unit 300.

The meta learning structure unit 200 (also referred to herein as a "meta learning device") estimates the channels of the UEs 30-1 to 30-Q newly connected to the base station 10 via meta learning.

Figure 5:
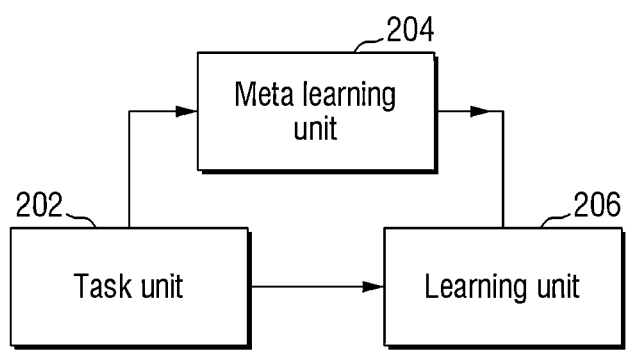
FIG. 5 is an illustrative block diagram for illustrating a meta learning structure unit of a channel estimating device according to embodiments.
Figure 6:
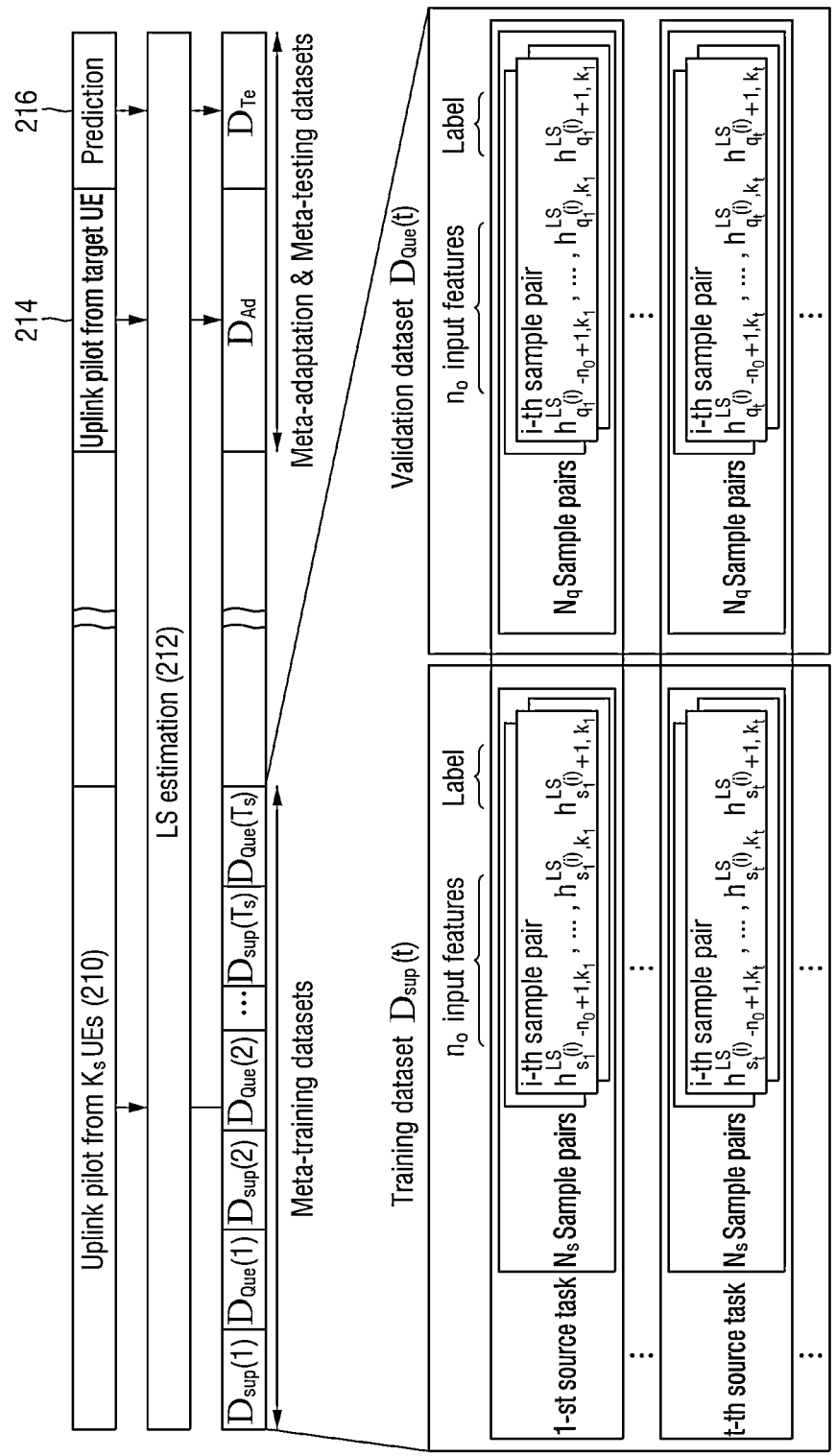
FIG. 6 is an illustrative diagram for illustrating a meta learning operation according to embodiments.
Figure 7:
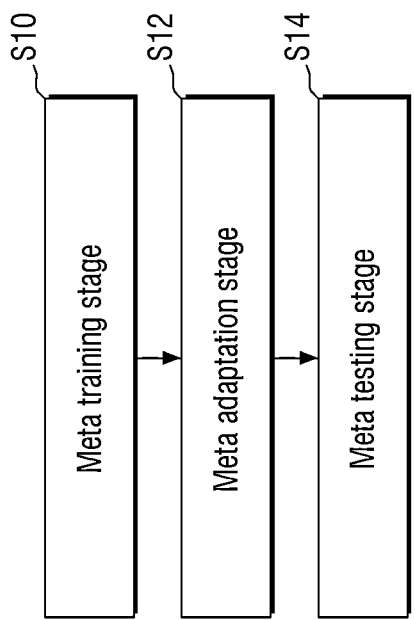
FIG. 7 is an illustrative flowchart for illustrating a meta learning operation according to embodiments.

Referring to FIG. 5 to FIG. 7, a specific structure and an operation of the meta learning structure unit 200 will be described.

Hereinafter, in Equations, a bold letter of each of lowercase and uppercase letters indicates a column vector (column matrix). $A^{-1}$, $A^T$, and $A^H$ represents matrix inverse, transpose, and conjugate transpose of a matrix A, respectively. $\mathbb{E}[\cdot]$ represents an expected value, and $\mathbb{R}^{m \times n}$ represents m×n real matrix. $|\cdot|$ represents a magnitude of scalar. $\|\cdot\|$ represents $\ell_2$ norm of a vector. $0_{m \times n}$ represents m×n all zero matrix, and $I_m$ represents m×m identity matrix. $\mathcal{CN}(m, \sigma^2)$ represents complex Gaussian noise having a mean m and a variance $\sigma^2$. $\lfloor x \rfloor$ represents a floor function of x.

FIG. 5 is an illustrative block diagram for illustrating a meta learning structure unit of a channel estimating device according to embodiments. FIG. 6 is an illustrative diagram for illustrating a meta learning operation according to embodiments. FIG. 7 is an illustrative flowchart for illustrating a meta learning operation according to embodiments.

Referring to FIG. 5, the meta learning structure unit 200 includes a task unit 202, a meta learning unit 204, and/or a learning unit 206.

The meta learning structure unit 200 may be formed in a hierarchical structure including a first layer composed of the task unit 202 and the learning unit 206 and a second layer composed of the meta learning unit 204.

When the meta learning structure unit 200 is formed in the hierarchical structure, the wireless communication system according to embodiments may reduce the number (e.g., amount) of training data used to estimate the channels of the new UEs and improve estimation accuracy at the same time (or contemporaneously).

In more detail, when the meta learning structure unit 200 is formed in the hierarchical structure, the channels of the UEs newly connected to the base station may be adaptively predicted with a smaller number of samples.

Referring to FIG. 1, FIG. 5, and FIG. 6, an example in which the wireless communication system according to embodiments is embodied as a single cell massive multi-antenna (multiple-input and multiple-output) wireless communication system as shown in FIG. 1 is described.

It is assumed that the base station 10 of the wireless communication system according to embodiments has been connected to the M antennas 12 as shown in FIG. 1. Further, it is assumed that the plurality of UEs 20-1 to 20-K each including one antenna has been connected to the base station 10.

The base station 10, more specifically, the meta learning structure unit 200 receives pilot signals 210 from the plurality of UEs 20-1 to 20-K, and performs training using a neural network (NN) (e.g., a first neural network model), based on the received pilot signals.

Specifically, a signal received by the meta learning structure unit 200 from each of the plurality of UEs 20-1 to 20-K at an n-th time (n is a positive integer) may be expressed based on a following Equation 1:

$$y_n = \sqrt{\rho} H_n x_n + w_n \qquad \text{Equation 1}$$

In this regard, $\rho$ denotes a signal-to-noise ratio (SNR), $H_n = H_n = [h_{n,1}, \ldots, h_{n,K}]$ denotes a channel matrix, $h_{n,k}$ denotes a channel formed between a k-th UE 20-k and the base station 10, $x_n = [x_{n,1}, \ldots, x_{n,K}]$ denotes a pilot signal, and $w_n \sim \mathcal{CN}(0, I_M)$ denotes a complex Gaussian noise.

In the present disclosure, a spatial channel model (SCM) of 3GPP (3rd Generation Partnership Project) is considered to design a channel prediction technique reflecting a realistic channel environment. However, techniques introduced in subsequent examples are not necessarily limited to the SCM. Further, an urban micro (Umi) situation is assumed.

The meta learning structure unit 200 may predict the channels of the UEs 30-1 to 30-Q newly connected to the base station 10 in a parallel manner. Therefore, it is assumed that the meta learning structure unit 200 considers the channel of the k-th UE 20-k. In this regard, the received signal received by the base station 10 may be expressed based on a following Equation 2:

$$y_{n,k} = \sqrt{\rho} h_{n,k} x_{n,k} + w_{n,k} \qquad \text{Equation 2}$$

Further, a received signal 214 obtained from a $k_T$-th new UE among the new UEs 30-1 to 30-Q connected to the base station 10 may be expressed based on following Equation 3:

$$y_{n,k_T} = \sqrt{\rho} h_{n,k_T} x_{n,k_T} + w_{n,k_T} \qquad \text{Equation 3}$$

In this regard, $k_T \in \mathcal{K}_{new}$ is an index of a new UE, and $K_{new}$ is an index set of new UEs.

In order to estimate the channels $h_{n,k_T}$ of the new UEs 30-1 to 30-Q connected to the base station 10, a temporal correlation of the channels is used. The meta learning structure unit 200 may perform an operation of estimating the channels $h_{n+1,k_T}$ at a future time, based on $n_o$ measurement values $\{y_{n-n_o+1,k_T}, \ldots, y_{n,k_T}\}$ between a current time when the channels of the new UEs 30-1 to 30-Q connected to the base station 10 are estimated and a past time before the current time.

In this regard, an objective function and optimization (or improvement) for channel estimation are defined based on a following Equation 4:

$$\text{minimize } \|h_{n+1,k_T} - \hat{h}_{n+1,k_T}\|^2 \text{ subject to } \hat{h}_{n+1,k_T} = f y_{n-n_o+1,k_T}, \ldots, y_{n,k_T} \qquad \text{Equation 4}$$

In this regard, $\hat{h}_{n+1,k_T}$ denotes a channel 216 estimated (e.g., predicted) using the meta learning structure unit 200 (e.g., using the first neural network model), $f(\cdot)$ denotes a channel predictor function, and $n_o$ denotes a complexity order. According to embodiments, references to minimization herein may also, or alternatively, refer to reduction. The complexity order is determined based on a moving speed of the UE. As the moving speed of the UE increases, the channel changes rapidly, and thus a larger complexity order is used. Further, since it is impossible (or difficult) to use $h_{n+1,k_T}$ as an actual channel in the objective function in an actual situation, a measurement value is used as in a following Equation 5 in accordance with the present disclosure:

$$\text{minimize } \|h_{n+1,k_T}^{LS} - \hat{h}_{n+1,k_T}\|^2 \text{ subject to } \hat{h}_{n+1,k_T} = f h_{n-n_o+1,k_T}^{LS}, \ldots, h_{n,k_T}^{LS} \qquad \text{Equation 5}$$

In this regard, $h_{n,k}^{LS}$ denotes a least square (LS) channel estimate 212 and is expressed based on a following Equation 6:

$$h_{n,k}^{LS} = \frac{1}{\sqrt{\rho} x_{n,k}} y_{n,k} = h_{n,k} + w'_{n,k}, \forall n, \forall k \qquad \text{Equation 6}$$

In this regard, $$w'_{n,k} = \frac{1}{\sqrt{\rho} x_{n,k}} w_{n,k}.$$

In this regard, SNR $\rho$ denotes a long-term statistic, and is perfectly estimated (or well estimated) by the base station 10. For training of the neural network (e.g., the first neural network model), a loss function is a sum of a mean squared error (MSE) between the LS channel estimate 212 and a channel estimate $\hat{h}_{n+1,k_T}$, and may be expressed based on a following Equation 7:

$$\text{Loss } = \frac{1}{N} \sum_{n=1}^{N} \|h_{n+1,k}^{LS} - \hat{h}_{n+1,k}\|^2 \qquad \text{Equation 7}$$

In this regard, N is a natural number and denotes the number of samples. The above-described received signal and the measurement value may be collectively referred to.

Subsequently, referring to FIG. 1, FIG. 5, and FIG. 6, the meta learning structure unit 200 may perform a meta learning operation based on the above-described operation.

Specifically, the meta learning structure unit 200 may perform a meta learning operation (e.g., of the first neural network model) via a meta learning stage, a meta adaptation stage, and/or a meta testing stage.

The meta learning structure unit 200 estimates channels of the new UEs 30-1 to 30-Q connected to the base station 10 using, for example, Model Agnostic Meta-Learning (MAML).

The meta learning structure unit 200 may accurately and quickly estimate the channels of the new UEs 30-1 to 30-Q connected to the base station 10 using a smaller number of adaptation samples, based on the MAML technique.

A task T created by the task unit 202 is composed of a dataset $\mathbb{D}$ and a loss function $\text{Loss}_\mathbb{D}$. Further, the task T may be classified into a source task $T_S$ used in the meta training stage meta training stage, and a target task $T_T$ used in the meta adaptation stage and the meta testing stage.

The meta learning structure unit 200 uses an independent dataset at each of the meta training stage, the meta adaptation stage, and the meta testing stage.

Specifically, the meta learning structure unit 200 defines the LS channel estimate 212 received by the base station 10 from at least one UE (for example, a first UE 20-1) among the plurality of UEs 20-1 to 20-K as a source dataset $\mathbb{D}_S$ of the meta training stage.

Further, the meta learning structure unit 200 may define the LS channel estimate 212 received by the base station 10 from one of UEs (for example, the new UEs 30-1 to 30-Q) other than the plurality of UEs 20-1 to 20-K used when defining the source dataset $\mathbb{D}_S$ of the meta training stage as a target dataset $\mathbb{D}_T$ of the meta adaptation stage, and the meta testing stage.

In the meta training stage, the meta learning structure unit 200 defines training data as a support set $\mathbb{D}_{Sup}$, and defines validation data as a query set $\mathbb{D}_{Que}$.

The support set $\mathbb{D}_{Sup}$ and the query set $\mathbb{D}_{Que}$ satisfy $\mathbb{D}_{Sup} \cap \mathbb{D}_{Que} = \emptyset$ so that they do not overlap each other to prevent (or reduce) overfitting of a neural network model.

Further, the meta learning structure unit 200 defines training data in the meta adaptation stage as an adaptation set $\mathbb{D}_{Ad}$, and defines training data in the meta testing stage as a testing set $\mathbb{D}_{Te}$.

In this regard, $\mathbb{D}_{Ad} \cap \mathbb{D}_{Te} = \emptyset$ is satisfied so that a sample of the adaptation set adaptation set $\mathbb{D}_{Ad}$ is not present in the testing set $\mathbb{D}_{Te}$.

Further, it is assumed that $\mathbb{D}_S = \mathbb{D}_{Sup} \cup \mathbb{D}_{Que}$ and $\mathbb{D}_T = \mathbb{D}_{Ad} \cup \mathbb{D}_{Te}$ are satisfied, and a distribution of $\mathbb{D}_T$ and a distribution of $\mathbb{D}_S$ are different from each other. Finally, the support set $\mathbb{D}_{Sup}$, the query set $\mathbb{D}_{Que}$, the adaptation set $\mathbb{D}_{Ad}$, and the testing set $\mathbb{D}_{Te}$ of the MAML executed by the meta learning structure unit 200 do not overlap each other.

That is, the base station 10, the controller 110, or the meta learning structure unit 200 acquires an uplink pilot signal received from at least some of the plurality of UEs 20-1 to 20-K and 30-1 to 30-Q and performs the LS channel estimation 212 based on the acquired uplink pilot signal. A result of the LS channel estimation 212 performed by the base station 10, the controller 110, or the meta learning structure unit 200 may be used in independent dataset of each of the meta training stage, the meta adaptation stage, and/or the meta testing stage.

The meta learning structure unit 200 uses total $T_S = T_u K_s$ source tasks in the meta training stage, wherein $T_u$ denotes the number of source tasks for each of the UEs 20-1 to 20-K, and K denotes the number of UEs for the source task.

A dataset $\mathbb{D}_S$ t of each t-th source task is composed of $\mathbb{D}_{Sup}$ t and $\mathbb{D}_{Que}$ t as two disjoint sets. In this regard, a t-th support set composed of $N_s$ label data is composed of $\mathbb{D}_{Sup}(t) = \{\{p_{Sup,t}^{(i)}, q_{Sup,t}^{(i)}\}\}_{i=1}^{N_s}$, and $\{p_{Sup,t}^{(i)}, q_{Sup,t}^{(i)}\}$ is an i-th sample pair of the support set.

In this regard, $n_o$ input features is defined as $p_{Sup,t}^{(i)} = \{h_{s_t^{(i)}-n_o+1,k_t}^{LS}, \ldots, h_{s_t^{(i)},k_t}^{LS}\}$, and one label is defined as $q_{Sup,t}^{(i)} = h_{s_t^{(i)}+1,k_t}^{LS} \cdot s_t^{(i)}$ is an i-th sample index of the support set.

$$k_t = \left\lfloor \frac{t-1}{T_u} \right\rfloor + 1$$

is an index of the UE.

In a similar manner, a query set of a t-th source task composed of $N_q$ label data is defined as $\mathbb{D}_{Que}(t) = \{\{p_{Que,t}^{(i)}, q_{Que,t}^{(i)}\}\}_{i=1}^{N_q}$, and $\{p_{Que,t}^{(i)}, q_{Que,t}^{(i)}\}$ is an i-th sample pair of the query set. $p_{Que,t}^{(i)} = \{h_{q_t^{(i)}-n_o+1,k_t}^{LS}, \ldots, h_{q_t^{(i)},k_t}^{LS}\}$, and $q_{Que,t}^{(i)} = h_{q_t^{(i)}+1,k_t}^{LS}$ are satisfied, and $q_t^{(i)}$ means an i-th sample index of the query set.

A meta adaptation dataset having $N_{ad}$ adaptation samples in a target task $\mathcal{T}_T$ is defined as $\mathbb{D}_{Ad} = \{\{p_{Ad}^{(i)}, q_{Ad}^{(i)}\}\}_{i=1}^{N_{ad}}$. In this regard, $p_{Ad}^{(i)} = \{h_{\alpha_T^{(i)}-n_o+1,k_T}^{LS}, \ldots, h_{\alpha_T^{(i)},k_T}^{LS}\}$ and $q_{Ad}^{(i)} = h_{\alpha_T^{(i)}+1,k_T}^{LS}$ are satisfied, $\alpha_T^{(i)}$ is an i-th target sample index in the meta adaptation dataset, and $k_T$ is an index of a target UE in the meta adaptation dataset. This is the same as (or similar to) an index of a new UE in the above Equation 3.

Further, a meta test dataset having $N_{te}$ test samples is defined as $\mathbb{D}_{Te} = \{\{p_{Te}^{(i)}, q_{Te}^{(i)}\}\}_{i=1}^{N_{te}}$. In this regard, $p_{Te}^{(i)} = \{h_{b_T^{(i)}-n_o+1,k_T}^{LS}, \ldots, h_{b_T^{(i)},k_T}^{LS}\}$ and $q_{Te}^{(i)} = h_{b_T^{(i)}+1,k_T}^{LS}$ are satisfied, and $b_T^{(i)}$ is an i-th target sample index in the meta test dataset.

In the meta training stage, the meta learning unit 204 aims to obtain an inductive bias using an entire source task. The inductive bias refers to an additional assumption made to improve general performance on an ungiven input in machine learning. That is, the inductive bias may be used to secure a general characteristic via an entire meta learning operation.

In the meta training stage, the meta learning unit 204 may acquire meta learning parameters via repeated training of inner-task update and outer-task update operations.

First, in the inner-task update, a batch structure is used to update inner-task parameters through each task. The meta learning unit 204 groups the source task by a V batch size, and updates a neural network parameter (e.g., of the first neural network model) every iteration repeated as many as V source tasks.

Therefore, the meta learning unit 204 updates inner-task parameters $\Omega_{Tr,t}$ of a t-th source task using the V batch size based on a mini-batch stochastic gradient descent (SGD) technique and based on a following Equation 8:

$$\Omega_{Tr,t} \leftarrow \Omega_{Tr,t} - \alpha \nabla_{\Omega_{Tr,t}} \text{Loss}_{\mathbb{D}_{Sup}(t)}(\Omega_{Tr,t}), \, t = 1, \ldots, V \quad \text{Equation 8}$$

In this regard, $\alpha$ denotes an inner learning rate, and $\text{Loss}_{\mathbb{D}_{Sup}}(t)$ denotes a loss function of $\mathbb{D}_{Sup}(t)$. The loss function uses a mean squared error between an expected value $\hat{q}_{Sup,t}^i$ and a target value $q_{Sup,t}^i$ and is expressed based on a following Equation 9:

$$\text{Loss}_{\mathbb{D}_{Sup}(t)} = \frac{1}{N_s} \sum_{i=1}^{N_s} \|\hat{q}_{Sup,t}^{(i)} - q_{Sup,t}^{(i)}\|^2 \quad \text{Equation 9}$$

In this regard, $q_{Sup,t}^i$ may contain noise as the LS channel estimate 212. The noise contained in the $q_{Sup,t}^i$ may be removed via an operation of the noise cancelling unit 300.

After the inner-task update has been completed, global network parameters $\Omega$ are optimized (or improved) via the outer-task update. In the outer-task update, the global network parameters Ω are updated so as to minimize (or reduce) a sum of the loss function. The sum of the loss function is expressed based on a following Equation 10:

$$\Sigma_{t=1}^{V} \text{Loss}_{\mathbb{D}_{Que}(t)}(\Omega_{Tr,t}) \qquad \text{Equation 10}$$

In this regard, $\text{Loss}_{\mathbb{D}_{Que}(t)}$ denotes a loss function in $\mathbb{D}_{Que}(t)$. The global network parameters Ω is updated based on an outer learning rate β and using an adaptive moment estimation (ADAM) optimizer. According to embodiments, the global network parameters Ω may be parameters of the first neural network model.

In the meta adaptation stage, adaptation parameters $\Omega_{Ad}$ are updated using the adaptation dataset $\mathbb{D}_{Ad}$, and based on the global network parameters, and using a SGD technique. The update is made based on a following Equation 11:

$$\Omega_{Ad} \leftarrow \Omega_{Ad} - \alpha \nabla_{\Omega_{Ad}} \text{Loss}_{\mathbb{D}_{Ad}(\Omega_{Ad})} \qquad \text{Equation 11}$$

In this regard, $\text{Loss}\mathbb{D}_{Ad}$ denotes a loss function of $\mathbb{D}_{Ad}$. Fine-tuning is carried out via a gradient step of $T_{ad}$, and, then, in the meta test stage, a channel predicted value is obtained using the obtained adaptation parameters $\Omega_{Ad}$ and the meta test dataset $\mathbb{D}_{Te}$. According to embodiments, the adaptation parameters $\Omega_{Ad}$ are parameters of the first neural network model.

A MAML-based channel estimating operation of the meta learning structure unit 200 according to embodiments may be executed based on a following algorithm 1:

---

Algorithm 1 MAML-Based Channel Predictor

---

1: Input: Source task $\{\mathcal{T}_S(t)\}_{t=1}^{Ts}$, Target task $\mathcal{T}_T$, inner learning rate α, outer learning rate β, batch size V, number of epochs $N_{epoch}$
2: Output: Predicted channel
3: Meta-training stage:
4: Randomly initialized the network parameters
5: for j = 1, ..., $N_{epoch}T_S/V$ do
6:     Randomly sample V batch of tasks from $\{\mathcal{T}_S(t)\}_{t=1}^{Ts}$
7:     Generate datasets $\{\mathbb{D}_{Sup}(t)\}_{t=1}^{V}$ and $\{\mathbb{D}_{Que}(t)\}_{t=1}^{V}$
8:     for t = 1, ..., V do
9:        Update $\Omega_{Tr,t}$ by (8) with $\mathbb{D}_{Sup}(t)$
10:     end for
11:     Update Ω to minimize (10)
12: end for
13: Meta-adaptation stage:
14: Generate datasets $\mathbb{D}_{Ad}$ and $\mathbb{D}_{Te}$ from $\mathcal{T}_T$
15: Load the meta-trained network parameters
16: for j = 1, ... $\mathcal{T}_{ad}$ do
17:     Update $\Omega_{Ad}$ by (11) with $\mathbb{D}_{Ad}$
18: end for
19: Meta-testing stage:
20: Predict the channel based on $\mathbb{D}_{Te}$ and $\Omega_{Ad}$

---

The meta learning structure unit 200 estimates the channels of the new UEs 30-1 to 30-Q to be connected to the base station 10 via machine learning using the learning unit 206. The meta learning structure unit 200 estimates the channels of the new UEs 30-1 to 30-Q to be connected to the base station 10 via the meta training stage, the meta adaptation stage, and the meta testing stage. According to embodiments, the learning unit 206 includes (e.g., is) the first neural network model.

That is, referring to FIG. 7, in order to estimate the channel, the meta learning structure unit 200 may perform the meta training stage in S10, and then, the meta adaptation stage in S12, and then the meta testing stage in S14. According to embodiments, the base station 10 may generate a communication signal for transmission to another device (e.g., a UE). The generation of the communication signal may include determining beamforming information (e.g., a magnitude and/or a phase) corresponding to a channel estimated using the meta learning structure unit 200. The base station 10 may transmit the communication signal to the other device using the beam forming information. According to embodiments, the base station 10 may generate beam forming information corresponding to a channel estimated using the meta learning structure unit 200, and receive a communication signal from the other device using the beam forming information.

Referring back to FIG. 1 and FIG. 4, the noise canceling unit 300 removes noise on input data used for the meta learning structure unit 200 to perform meta learning. As discussed herein, removal of noise may also refer to removal or reduction of the noise.

In order to remove noise contained in data used when the meta learning structure unit 200 performs meta learning, the noise canceling unit 300 may apply a DIP (deep image prior) technique to the data to preprocess (or process) the data and then provide the data which has been preprocessed (or processed).

Hereinafter, an operation of the noise canceling unit 300 will be described in detail.

Figure 8:
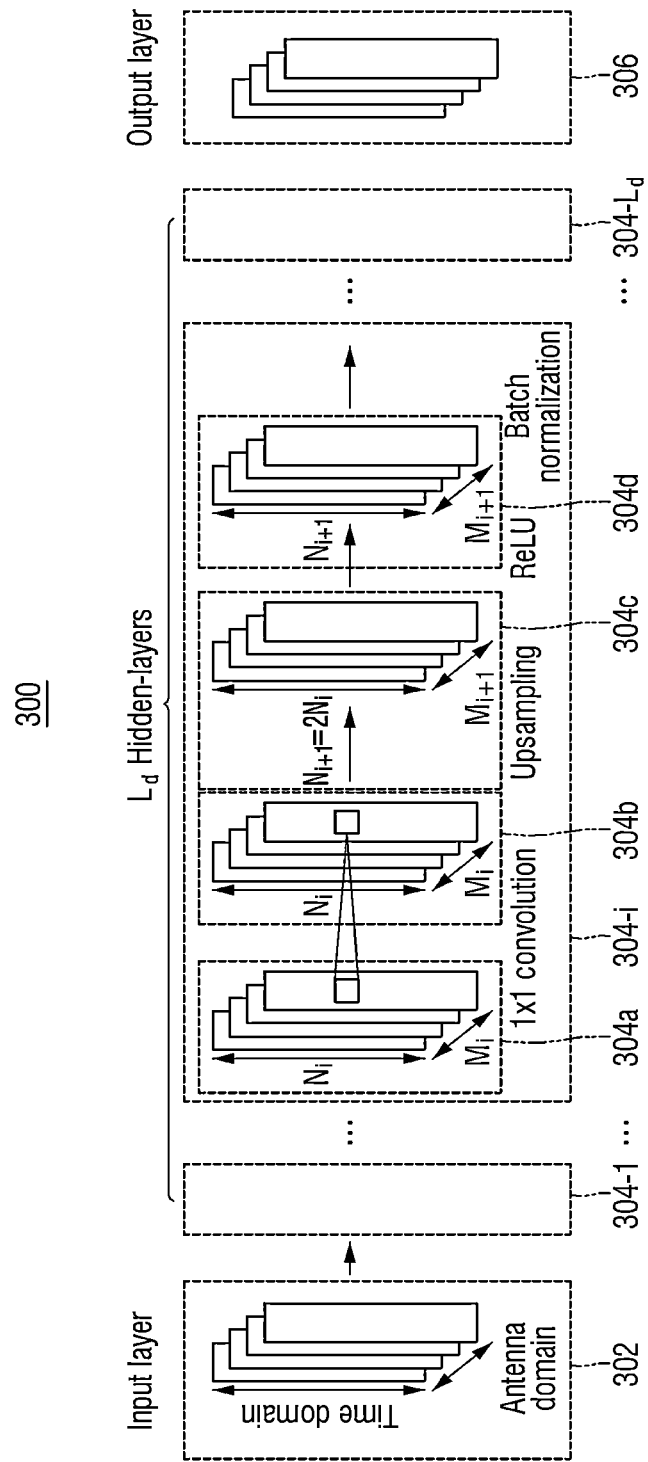
FIG. 8 is an illustrative diagram for illustrating an operation of a noise canceling unit of a channel estimating device according to embodiments.

FIG. 8 is an illustrative diagram for illustrating an operation of a noise canceling unit of a channel estimating device according to embodiments.

Referring to FIG. 1, FIG. 4, and FIG. 8, the noise canceling unit 300 may remove, for example, noise contained in a $q_{Sup,t}^{(i)}$ as described above in the Equation 9.

Specifically, the noise canceling unit 300 may remove noise contained in a signal or data using a scheme which maximizes (or increases) a likelihood function. In addition, the noise canceling unit 300 may minimize (or reduce) the mean square error using the DIP (Deep Image Prior) technique to remove noise contained in a signal or data used in the meta learning structure unit 200. This may be described using a following Equation 12:

$$\Phi^* = \underset{\Phi}{\arg\min} \left\| h_{n,k}^{LS} - \hat{h}_{n,k}^{LS} \right\|^2 \text{ subject to } \hat{h}_{n,k}^{LS} = g_{\Phi}(z) \qquad \text{Equation 12}$$

$g_{\Phi}(z)$ denotes a neural network function (e.g., of a second neural network model) having network parameters Φ and an input z. The DIP (Deep Image Prior) technique uses a feature that an output of the neural network model (e.g., the second neural network model) is more suitable for a normalized signal and is relatively less suitable for random noise. According to embodiments, the second neural network model may be the same as, similar to, or different from the first neural network model.

Therefore, the DIP (Deep Image Prior) technique does not rely on statistical characteristics of a channel in the above Equation 8. Further, the DIP technique may perform gradient descent without training a NN (neural network) that inputs a larger number (e.g., amount) of training data, thereby obtaining an optimized (or improved) value for the signal or data used in the meta learning structure unit 200.

Specifically, in order to remove the noise contained in the signal or data used in the meta learning structure unit 200, in applying the DIP, the noise canceling unit 300 may accumulate the LS channel estimate 212 in FIG. 6 into 2-dimensional data $H^{LS}$ as in a following Equation 13:

$$H^{LS} = [[H^{LS}_{2D}[m, n]]_{m=1}^{M}]_{n=1}^{N} \qquad \text{Equation 13}$$

In this regard, $H_{2D}^{LS}[m, n]$ represents a signal received at an n-th time by a m-th antenna of the base station 10.

According to embodiments, since the DIP (Deep Image Prior) technique may handle only real data, the DIP technique may accumulate real and imaginary parts of the received signal in the Equation 13. The accumulating result may be expressed as $\mathcal{H}^{LS} \in \mathbb{R}^{2M \times N}$.

A DIP (Deep Image Prior) structure used by the noise canceling unit 300 is composed of an input layer 302, La hidden-layers 304-1 to 304-Ld, and an output layer 306. According to embodiments, the DIP structure includes (e.g., is) the second neural network.

The input layer 302 may receive an input composed of $M_i$ representing a dimension of a domain of the antenna 12 of the base station (e.g., antenna index and/or quantity of antennas), and $N_i$ representing a dimension of a time domain.

In this regard, each of the hidden-layers 304-1 to 304-Ld may be composed of 4 elements.

Specifically, each of the hidden-layers 304-1 to 304-Ld may be composed of a 1×1 convolutional layer 304a, an upsampling layer 304b, a rectified linear unit (ReLU) activation layer 304c, and/or a batch normalization layer 304d.

Accordingly, an i-th hidden-layer 304-i as an example of one of the hidden-layers 304-1 to 304-Ld may be expressed based on a following Equation 14

$$g_{\phi_i} = \text{Batch}(\text{ReLU}(\text{Upsample}(\phi_i \circledast Z_i))) \qquad \text{Equation 14}$$

In this regard, $\phi_i$ denotes model parameters of the i-th hidden-layer 304-i, $Z_i$ denotes an input of the i-th hidden-layer 304-i, and $\circledast$ denotes a 1×1 convolution operation.

In this regard, $M_i$ denotes the dimension of the domain of the antenna 12 of the base station, and $N_i$ denotes the dimension of the time domain.

Because spatial correlation is used via the 1×1 convolutional layer 304a using the 1×1 convolution operation, the number of network parameters may be reduced.

In the upsampling layer 304b, the dimension of the time domain is doubled ($N_{i+1} = 2N_i$) according to bilinear transformation. Since the temporal correlation of the channels exists, the upsampling layer 304b may use correlation between adjacent elements in the time domain.

The last hidden-layer 304-Ld may be expressed based on a following Equation 15 using the ReLU activation layer 304c and the batch normalization layer 304d without the upsampling layer 304b.

$$g_{\phi_{L_d}} = \text{Batch}\left(\text{ReLU}(\phi_{L_d} \circledast Z_{L_d})\right) \qquad \text{Equation 15}$$

The output layer 306 may be expressed based on a following Equation 16:

$$g_{\phi_{L_d+1}} = \phi_{L_d+1} \circledast Z_{L_d+1} \qquad \text{Equation 16}$$

Optimization (or improvement) in which the noise canceling unit 300 removes the noise contained in the signal or the data used in the meta learning structure unit 200 via the DIP technique may be expressed based on a following Equation 17:

$$\Phi^* = \underset{\Phi}{\text{argmin}} \left\| \mathcal{H}^{LS} - \widehat{\mathcal{H}}^{LS} \right\|^2 \qquad \text{Equation 17}$$

In this regard, $\Phi = [\phi_1, \ldots, \phi_{L_d+1}]$, and $\widehat{\mathcal{H}}^{LS} = g_\Phi Z_1$ is an estimate of $\mathcal{H}^{LS}$. In this regard, $Z_1$ is a random initial value and has a dimension of $M_1 \times N_1$.

The signal or data used in the meta learning structure unit 200 as optimized (or improved) via the DIP structure (e.g., the second neural network model) used by the noise canceling unit 300 and based on the above Equation 17 may be derived by repeating iteration of $N_{iter}$ and using an ADAM (adaptive moment estimation) optimizer.

Figure 9:
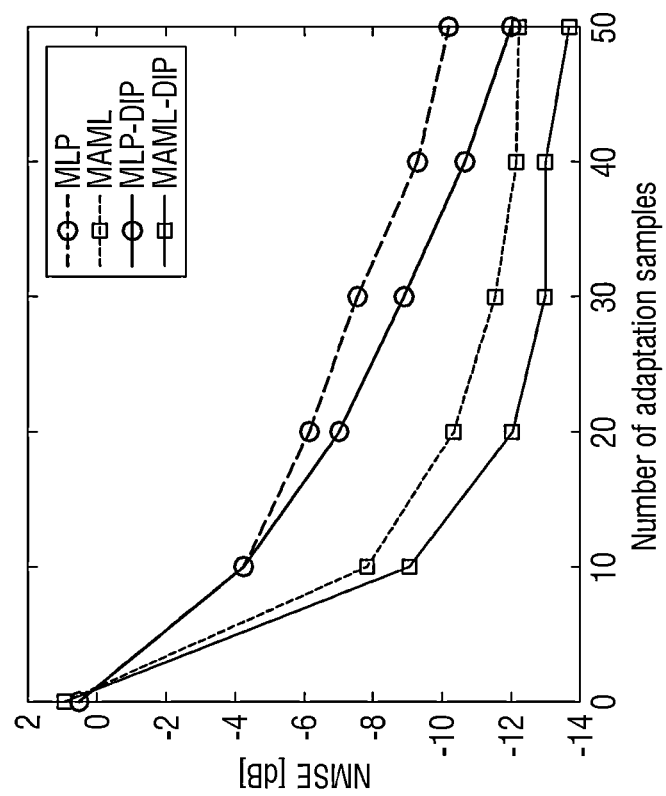
FIG. 9 to FIG. 10 are graphs for illustrating superiority of channel estimating operation performance of a wireless communication system according to embodiments.
Figure 10:
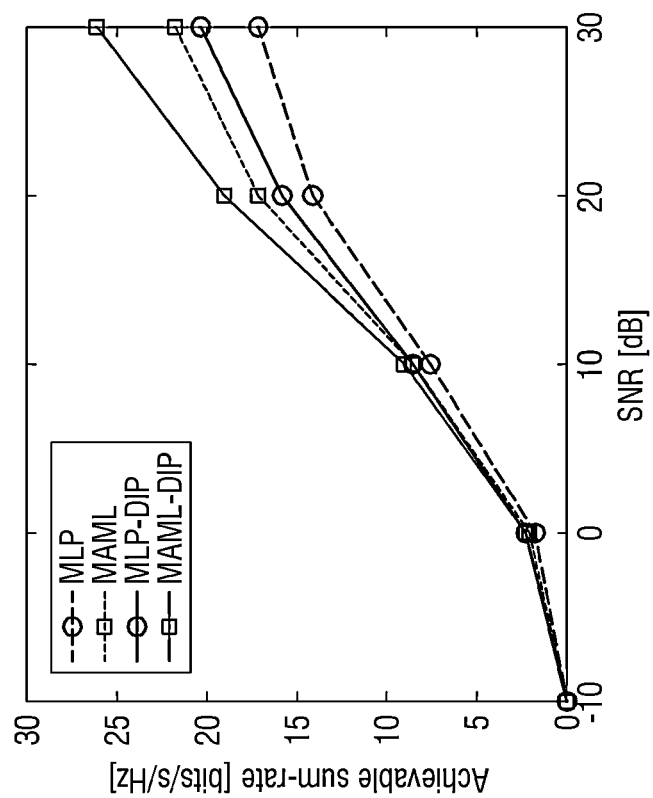

FIG. 9 to FIG. 10 are graphs for illustrating superiority of channel estimating operation performance of a wireless communication system according to embodiments.

A comparison graph via simulation uses a spatial channel model (SCM) as a channel model used by the wireless communication system according to embodiments and considers an urban micro (Umi) situation. Further, a carrier frequency is 2.3 GHz, a moving speed of the UE is 3 km/h, and a duration of a time slot is 40 ms. 64 base station antennas are used. In the MAML algorithm, a MLP (multilayer perceptron) structure is used, which is composed of L=4 hidden-layers composed of 512 nodes. The DIP structure uses a CNN structure which is composed of $L_d=4$ hidden-layers with $M_i=64$ filters. The number of source tasks per UE $T_u=1024$, the complexity order $n_o=3$, the number of epochs $N_{epoch}=20$, and the batch size V=64 are used. Further, the number of support sets $N_s=10$, the number of query sets $N_q=10$, an inner learning rate $\alpha=10^{-1}$, and an outer learning rate $\beta=10^{-5}$ are used.

Further, in all the graphs, a MAML-DIP graph line is a graph of a result of using the MAML in the channel estimating operation and using the DIP structure in the noise removal. A MLP-DIP graph line is a graph of a result of using only MLP without using MAML in the channel estimating operation and using the DIP structure in removing the noise. Further, a MAML graph line is a graph of a result of using MAML in the channel estimating operation and not removing the noise. Further, a MLP graph line is a graph of a result of using MLP in the channel estimating operation and not removing the noise.

First, referring to FIG. 9, in the graph shown in FIG. 9, a normalized mean squared error (NMSE) (unit: dB) is used as a performance metric of the channel estimating operation performance of the wireless communication system according to embodiments.

An X axis represents the number of adaptation samples of new UEs connected to the base station.

The normalized mean squared error may be expressed based on a following Equation 18:

$$\text{NMSE} = \mathbb{E}\left[\|\hat{h}_{n+1,k} - h_{n+1,k}\|^2 / \|h_{n+1,k}\|^2\right] \qquad \text{Equation 18}$$

That is, it is identified that NMSE characteristic (MAML-DIP graph line) obtained via an operation using the Model Agnostic Meta-Learning (MAML) in the meta learning structure unit of the channel estimating device in the wireless communication system according to embodiments, and an operation using the DIP (Deep Image Prior) in the noise canceling unit of the channel estimating device is the best (e.g., provides a lower NMSE characteristic using fewer adaptation samples).

Further, referring to FIG. 10, in the graph shown in FIG. 10, an achievable sum-rate (unit: bits/s/Hz) is used as a performance metric of the channel estimating operation performance of the wireless communication system according to embodiments.

An X axis represents SNR (dB).

All types of combiners may be used in the present disclosure to calculate the achievable sum-rate. However, in order to reduce an inter-user interference, a zero-forcing (ZF) combiner is used in this graph, which may be expressed based on a following Equation 19:

$$\tilde{F}_n^T = (\hat{H}_n^H \hat{H}_n)^{-1} \hat{H}_n^H \quad \text{Equation 19}$$

In this regard, $\hat{H}_n$ denotes a channel estimating matrix. In this regard, an unit-norm combiner $f_{n,k_T} = \tilde{f}_{n,k_T}/\|\tilde{f}_{n,k_T}\|$ is used, and $\tilde{f}_{n,k_T}$ denotes a $k_T$-th column vector of $\tilde{F}_n$. Thus, an achievable rate of a $k_T$-th UE may be expressed based on $f_{n,k_T}$ and using a following Equation 20:

$$R_{k_T} = \log_2\left(1 + \frac{\rho|f_{n,k_T}^T h_{n,k_T}|^2}{\rho \sum_{i \neq k_T} |f_{n,k_T}^T h_{n,i}|^2 + 1}\right) \quad \text{Equation 20}$$

Finally, the achievable sum-rate output as a graph of FIG. 10 may be derived based on a following Equation 21:

$$R = \sum_{k_T \in \mathcal{K}_{\text{new}}} R_{k_T} \quad \text{Equation 21}$$

That is, it is identified that achievable sum-rate characteristic (MAML-DIP graph line) obtained via an operation using the Model Agnostic Meta-Learning (MAML) in the meta learning structure unit of the channel estimating device in the wireless communication system according to embodiments, and an operation using the DIP (Deep Image Prior) in the noise canceling unit of the channel estimating device is the best (e.g., provides a higher achievable sum-rate).

Although embodiments of the present disclosure have been described above with reference to the accompanying drawings, it will be understood by those of ordinary skill in the art that the present disclosure is not limited thereto and may be implemented in many different forms without departing from the technical idea or essential features thereof. Therefore, it should be understood that embodiments set forth herein are merely examples in all respects and not restrictive.

Conventional devices (e.g., base stations) and methods experience difficulty in performing wireless communication. Specifically, in circumstances in which a larger number of antennas are used to perform wireless communication (e.g., massive MIMO), a higher amount of channel information will be processed during channel estimation, especially in circumstances in which other devices connected via the wireless communication (e.g., UEs) are rapidly changing position (e.g., moving). Accordingly, the conventional devices and methods use excessive resources (e.g., power, processor, memory, bandwidth, delay, etc.) in performing channel estimation. Also, the conventional devices and methods provide insufficient channel estimation accuracy due to interference between larger numbers of devices connected via the wireless communication (e.g., massive MIMO).

However, according to embodiments, improved devices and methods are provided for performing wireless communication. For example, the improved devices and methods may perform meta learning to train a neural network model to perform channel estimation using less training data. Accordingly, the improved devices and methods are able to rapidly estimate a higher amount of channel information (e.g., such as used in connection with massive MIMO) using the meta learned neural network model, thereby reducing resource consumption (e.g., power, processor, memory, bandwidth, delay, etc.) with respect to the conventional devices and methods. Also, the improved devices and methods perform a deep image prior technique to remove or reduce noise in the training data used to meta learn the neural network model, thereby increasing the accuracy of the channel estimation performed using the trained neural network model. Therefore, the improved devices and methods overcome the deficiencies of the conventional devices and methods to perform channel estimation (e.g., in a massive MIMO scenario) while reducing resource consumption and increasing channel estimation accuracy.

According to embodiments, operations described herein as being performed by the wireless communication system, the base station 10, the plurality of UEs 20-1 to 20-K, the new UEs 30-1 to 30-Q, the wireless communication unit 100, the controller 110, the channel estimation unit 120, the meta learning structure unit 200, the noise canceling unit 300, the task unit 202, the meta learning unit 204, and/or the learning unit 206 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In embodiments, the processing circuitry may perform some operations (e.g., the operations described herein as being performed by the first neural network and/or second neural network) by artificial intelligence and/or machine learning. As an example, the processing circuitry may implement an artificial neural network (e.g., the first neural network and/or second neural network) that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

Herein, while described as a neural network, the first neural network model and/or second neural network model (each also referred to herein as the machine learning model) may have any structure that is trainable, e.g., with training data. For example, the machine learning model may include an artificial neural network, a decision tree, a support vector machine, a Bayesian network, a genetic algorithm, and/or the like. The machine learning model is described herein by mainly referring to an artificial neural network, but embodiments are not limited thereto. Non-limiting examples of the artificial neural network may include a convolution neural network (CNN), a region based convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and/or the like.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 130). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

What is claimed is:

1. A meta learning device comprising:
   processing circuitry configured to
     receive pilot signals from a plurality of first user equipment (UEs) to obtain received pilot signals, the received pilot signals being based on existing wireless communication connections of the plurality of first UEs, and
     estimate channels of a plurality of second UEs via meta learning using the received pilot signals, the channels corresponding to new wireless communication connections of the plurality of second UEs.

2. The meta learning device of claim 1, wherein the processing circuitry is configured to estimate the channels using Model Agnostic Meta-Learning (MAML).

3. The meta learning device of claim 1, wherein the processing circuitry is configured to perform the meta learning by executing a meta training stage, a meta adaptation stage, and a meta testing stage.

4. The meta learning device of claim 3, wherein the processing circuitry is configured to:
   first define a first least square channel estimate as a source data set of the meta training stage, the first least square channel estimate being obtained from a first UE among the plurality of first UEs; and
   perform the meta learning based on the first least square channel estimate.

5. The meta learning device of claim 4, wherein the processing circuitry is configured to:
   second define a plurality of second least square channel estimates as a target data set of each of the meta adaptation stage and the meta testing stage, each respective second least square channel estimate among the plurality of second least square channel estimates being obtained from a different one among the plurality of second UEs; and
   perform the meta learning based on the plurality of second least square channel estimates.

6. The meta learning device of claim 3, wherein the processing circuitry is configured to define training data as a support set and define validation data as a query set in the meta training stage,
   wherein an intersection between the support set and the query set is an empty set.

7. The meta learning device of claim 3, wherein the processing circuitry is configured to:
   define a first data set as an adaptation set in the meta adaptation stage; and
   define a second data set as a testing set in the meta testing stage,
   wherein an intersection between the adaptation set and the testing set is an empty set.

8. The meta learning device of claim 1, wherein the processing circuitry is configured to perform the meta learning to train a neural network model.

9. A base station of a wireless communication system, a plurality of first user equipment (UEs) having been connected to the base station, and the base station comprising:
   processing circuitry configured to
     receive pilot signals from the plurality of first UEs to obtain received pilot signals, and
     estimate channels of a plurality of second UEs via meta learning using the received pilot signals, the plurality of second UEs being newly connected to the base station.

10. The base station of claim 9, wherein the processing circuitry is configured to estimate the channels via meta learning including estimating the channels using Model Agnostic Meta-Learning (MAML).

11. The base station of claim 9, wherein the processing circuitry is configured to perform the meta learning by executing a meta training stage, a meta adaptation stage, and a meta testing stage.

12. The base station of claim 11, wherein the processing circuitry is configured to:
   first define a first least square channel estimate as a source data set of the meta training stage, the first least square channel estimate being obtained by the base station from a first UE among the plurality of first UEs;
   second define a plurality of second least square channel estimates as a target data set of each of the meta adaptation stage and the meta testing stage, each respective second least square channel estimate among the plurality of second least square channel estimates being obtained by the base station from a different one among the plurality of second UEs; and
   perform the meta learning based on the first least square channel estimate and the plurality of second least square channel estimates.

13. The base station of claim 11, wherein the processing circuitry is configured to define training data as a support set and define validation data as a query set in the meta training stage,
   wherein an intersection between the support set and the query set is an empty set.

14. The base station of claim 11, wherein the processing circuitry is configured to:
   define a first data set as an adaptation set in the meta adaptation stage; and
   define a second data set as a testing set in the meta testing stage,
   wherein an intersection between the adaptation set and the testing set is an empty set.

15. The base station of claim 9, wherein the processing circuitry is configured to perform the meta learning to train a neural network model.

16. The base station of claim 9, wherein the processing circuitry is configured to remove noise contained in an input value of the meta learning.

17. The base station of claim 16, wherein the processing circuitry is configured to remove the noise contained in the input value of the meta learning using a Deep Image Prior (DIP) scheme.

18. A channel estimating device of a wireless communication system, the channel estimating device comprising:
   processing circuitry configured to
      receive pilot signals from a plurality of first user equipment (UEs) to obtain received pilot signals, the plurality of first UEs having been connected to a base station of the wireless communication system,
      estimate channels of a plurality of second UEs via meta learning using the received pilot signals, the plurality of second UEs being newly connected to the base station, and
      remove noise contained in an input value of the meta learning.

19. The channel estimating device of claim 18, wherein the processing circuitry is configured to estimate the channels using Model Agnostic Meta-Learning (MAML).

20. The channel estimating device of claim 18, wherein the processing circuitry is configured to perform the meta learning by executing a meta training stage, a meta adaptation stage, and a meta testing stage.

* * * * *